(12) United States Patent  (10) Patent No.: US 8,439,474 B2
Fujinaga  (45) Date of Patent: May 14, 2013

(54) PRINT CONTROL APPARATUS AND METHOD

(75) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 12/960,393

(22) Filed: Dec. 3, 2010

(65) Prior Publication Data

US 2011/0211009 A1 Sep. 1, 2011

(30) Foreign Application Priority Data

Feb. 26, 2010 (JP) ................................. 2010-041657

(51) Int. Cl.
B41J 29/38 (2006.01)
(52) U.S. Cl.
USPC .......................................................... 347/16
(58) Field of Classification Search .................... 347/16; 372/38.02; 400/583; 8/151; 358/1.15
See application file for complete search history.

(56) References Cited

U.S. PATENT DOCUMENTS

| 4,545,086 A * | 10/1985 | Varner ............................. 8/151 |
| 6,213,652 B1* | 4/2001 | Suzuki et al. ................. 358/1.15 |
| 2006/0023761 A1* | 2/2006 | Moriyama ................. 372/38.02 |
| 2011/0243637 A1* | 10/2011 | Nakamura et al. ............ 400/583 |

FOREIGN PATENT DOCUMENTS

| JP | 2005-169918 A | 6/2005 |
| JP | 2005169918 | * 6/2005 |
| JP | 2008126530 | * 6/2008 |
| JP | 2009226758 | * 10/2009 |

* cited by examiner

Primary Examiner — Stephen Meier
Assistant Examiner — Carlos A Martinez
(74) Attorney, Agent, or Firm — Canon USA Inc IP Division (57) ABSTRACT

Whether a continuous sheet usable for printing on the basis of first print data and a continuous sheet usable for printing on the basis of second print data are the same or not is determined. If it is determined that they are the same, an image based on the first print data and an image based on the second print data are printed continuously on a continuous sheet. When an image based on the second print data is arranged at an end of a continuous sheet, the second print data is assigned to the beginning of print data to be printed on another continuous sheet.

12 Claims, 7 Drawing Sheets

PRINT CONTROL APPARATUS AND METHOD

BACKGROUND OF THE INVENTION

1. Field of the Invention

The present invention relates to a print control apparatus and method for printing on a continuous sheet.

2. Description of the Related Art

Hitherto, a technology for printing an image on a continuous sheet such as roll paper has been known which detects the remaining amount of a continuous sheet and executes a print job that uses a less amount of sheet than the detected remaining amount. (Refer to Japanese Patent Laid-Open No. 2005-169918).

However, the technology disclosed in Japanese Patent Laid-Open No. 2005-169918 may waste the difference between the detected remaining amount and the amount of the sheet used by a print job. When a wrong remaining amount is detected, the difference may possibly increase.

On the other hand, in printing up to the end of a continuous sheet, the printable amount of print data is not unknown until the printing processing is actually performed. Thus, preparing the print data to be printed after replacement of a continuous sheet is difficult before the continuous sheet runs out, which may delay the processing.

SUMMARY OF THE INVENTION

According to one aspect of the present invention, there are provided a print control apparatus and method which solve the problems. According to another aspect, there are provided a print control apparatus and method which allow use of a continuous sheet without wastes in printing on a continuous sheet and efficient implementation of printing processing.

Further features of the present invention will become apparent from the following description of exemplary embodiments with reference to the attached drawings.

DESCRIPTION OF THE EMBODIMENT

An Embodiment of the present invention will be described below with reference to drawings. The relative configurations and device forms of the components of an apparatus according to the embodiment are for illustration purposes only, and the present invention is not limited thereto only.

Figure 1:
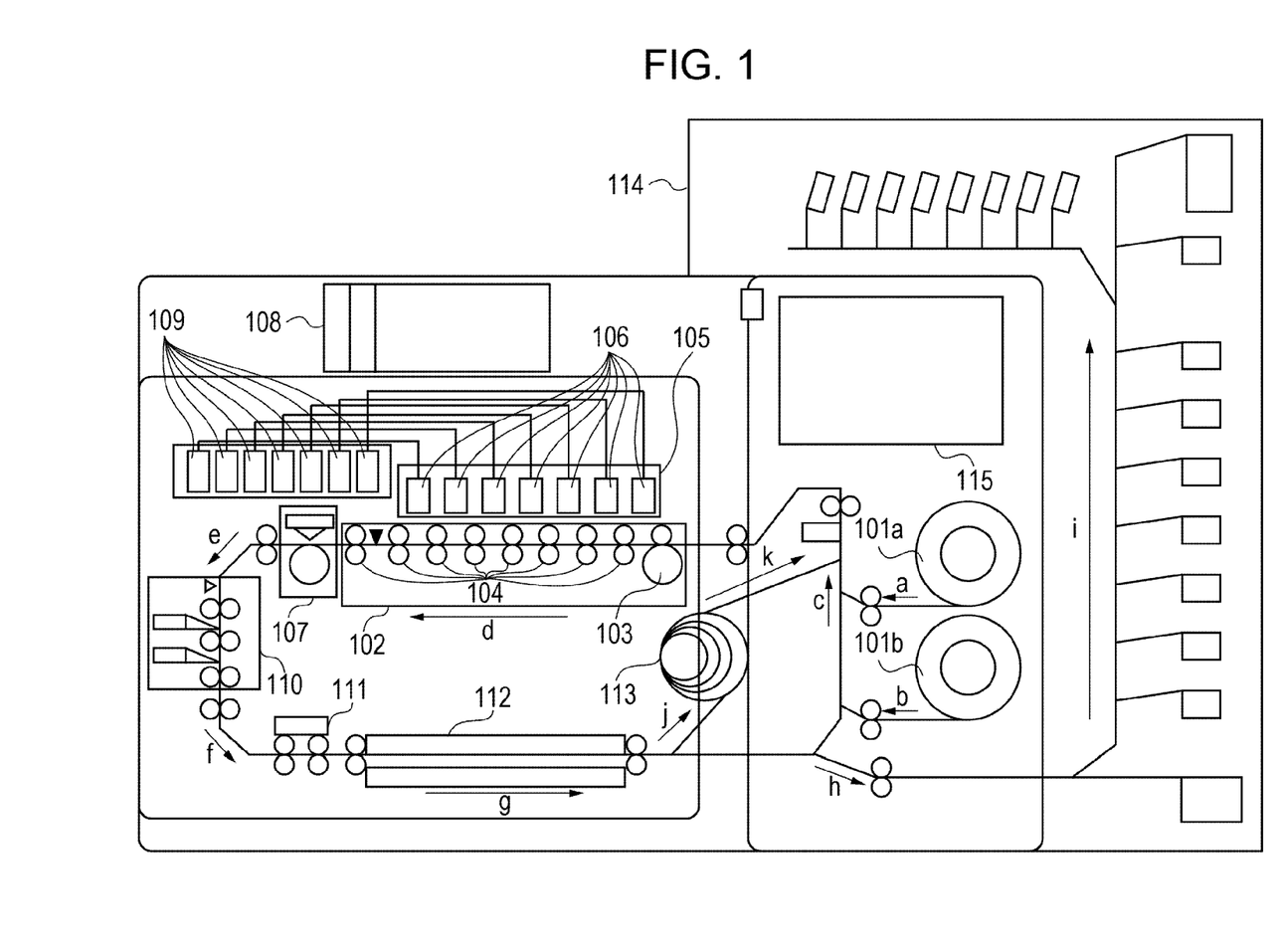
FIG. 1 illustrates a configuration of an image forming apparatus which is an example of an embodiment of the present invention.

FIG. 1 is a schematic configuration of an image forming apparatus which is an example of a print control apparatus according to an embodiment. The image forming apparatus illustrated in FIG. 1 only has a printing function of printing data received from an external apparatus but may be, without limiting thereto, one which functions as a copy machine further including a reader which scans an image on a copy or a multifunction apparatus further including other functions.

A roll sheet will be described as an example of a recording material (recording medium or recording paper) to be printed. The roll sheet is an example of a continuous sheet, the continuous sheet may not be wound on a roll. The continuous sheet may be automatically cut by an image forming apparatus or may be cut in accordance with a manual instruction by a user. The recording material is not limited to paper, but various materials may be used if they are printable. The image forming apparatus may not only print a continuous sheet but also print pre-cut sheets having a predetermined size.

The printing method is not limited to ink-jet printing of an image by using a liquid ink for image printing, which will be described below. The recording agent to be applied to a recording material may be solid ink, or recording may be performed by various recording methods such as electrophotography using toner, sublimation, thermal transfer, and dot impact. Recording may further be color recording using recording agents of a plurality of colors or monochrome recording using black (including gray). Printing may not be limited to printing of a visible image but may be printing of an invisible image or an image which is difficult to see. Instead of general image printing, various printing may be performed such as printing of a wiring pattern, a physical pattern in part manufacturing, and a base arrangement of DNA. In other words, the present invention is applicable to various types of recording apparatuses if they can apply a recording agent to a recording material. When an operation in printing processing is controlled in the image forming apparatus in accordance with an instruction from an external apparatus connected to the image forming apparatus in FIG. 1, the external apparatus may be a print control apparatus.

FIG. 1 is a section view illustrating a schematic configuration of the entire image forming apparatus which uses a roll sheet (longer continuous sheet than a print unit (one page) in the direction of convey) as a recording material. The image forming apparatus includes components 101 to 115, which will be described below, within one enclosure. However, those components may be provided separately in a plurality of enclosures.

The control unit 108 contains a controller (including a CPU or MPU), an output device of user interface information (a generator of display information or sound information, for example), and control units having I/O interfaces and is responsible for control over the entire image forming apparatus.

Two units of an upper sheet cassette 101a and a lower sheet cassette 101b hold and feed roll sheets. A user mounts a roll sheet (called a sheet hereinafter) on a magazine and loads it to the body of the image forming apparatus. The sheets drawn from the upper sheet cassette 101a and lower sheet cassette 101b are conveyed in the a-direction and b-direction, respectively, in FIG. 1. The sheet from either one of the cassettes moves in the c-direction illustrated in FIG. 1 and reaches to a conveying unit 102. The conveying unit 102 conveys a sheet being printed in the d-direction (horizontal direction) in FIG. 1 through a plurality of rotary rollers 104. In order to switch the feeding sheet cassette from one to the other, the already drawn sheet is wound back into the currently used cassette, and the sheet to replace is fed from the cassette having the sheet.

A head unit 105 is placed above and faced against the conveying unit 102. The head unit 105 holds independent print heads 106 for a plurality of colors (seven in this embodiment) in the direction of conveying a sheet. According to this embodiment, seven print heads are provided corresponding to seven colors of C (cyan), M (magenta), Y (yellow), LC (light cyan), LM (light magenta), G (gray), and K (black). Other colors may be used, or any one or any combination of those colors may be used.

The image forming apparatus causes the print heads 106 to eject ink to a sheet to form an image in synchronization with the convey of a sheet by the conveying unit 102. The print heads 106 are placed at a position where they can eject ink to areas of a sheet without the rotary rollers 104 underneath. Instead of direct ejection of ink to a sheet, ink may be applied to an intermediate transfer member first, and the ink may then be applied to a sheet to form an image.

The conveying unit 102, head unit 105, and print heads 106 are included in a unit for printing of this embodiment.

Ink tanks 109 separately reserve different color inks. From the ink tanks 109, inks are supplied to sub tanks through tubes corresponding to the colors. From the sub tanks, inks are supplied to the print heads 106 through tubes.

The print heads 106 have line heads for colors (seven colors in this embodiment) in the d-direction of convey in printing. The line heads for colors may be a seamless single nozzle chip or have divided nozzle chips regularly in a line or in a staggered arrangement. According to this embodiment, what is called a full multi head is used which has nozzles in a range covering the width of the print area of a sheet having a maximum size supported by the image forming apparatus. The ink-jet system by which ink is ejected from nozzles may use a heater element, a piezoelement, an electrostatic element, or an MEMS element, for example. On the basis of the print data, an ink is ejected from the nozzle of the corresponding head at the time determined by an output signal from an encoder 103 for convey.

After an image is formed on the sheet, the sheet is conveyed from the conveying unit 102 to a scanner unit 107. In the scanner unit 107, a printed image and/or special pattern is optically scanned to check whether the printed image has any problem or not and/or check the state of the image forming apparatus including the state of ink ejection. In order to check the printed image, the ink ejection state may be checked by reading a pattern for checking the states of the heads, or the success/failure of the printing may be checked by comparing the printed image and its original image. The method for checking may be selected properly from various methods.

The sheet is conveyed from the vicinity of the scanner unit 107 in the e-direction and is guided to a cutter unit 110. The cutter unit 110 cuts the sheet into predetermined print unit lengths. The predetermined printing unit length depends on the image size to print. For example, an L-size photo has a length of 135 mm in the direction of convey, and the A4 size has a length of 297 mm in the direction of convey. The cutter unit 110 in simplex printing mode cuts a sheet into pages but may not cut into pages with some kinds of print job. The cutter unit 110 in duplex printing mode does not cut the first side (which is the side to be printed first such as the front surface) of a sheet into page units, but an image is continuously printed to a predetermined length. The sheet is then cut into page units after the second side (which is the side to be printed afterward such as its back surface) is printed. The cutter unit 110 does not typically cut for every one image in one side printing mode or in back surface printing in duplex printing mode. The cutter unit 110 does not cut until a sheet is conveyed to a predetermined length. Another cutter device cuts the sheet for every one image (or one page) by a manual operation, for example. When the sheet is required to cut in the width direction, another cutter device is used to cut.

The sheet conveyed from the cutter unit 110 is conveyed in the f-direction in FIG. 1 within the unit and is conveyed to a back surface printing unit 111. The back surface printing unit 111 prints predetermined information on the back surface of a sheet when an image is to be printed only on one side of the sheet. The information to be printed on the back surface of a sheet may include information such as a letter, symbol and code corresponding to each print image, (such as an order management number). When the print heads 106 print an image for a print job in duplex printing mode, the back surface printing unit 111 prints information as described above in the area excluding the area on which the print heads 106 print an image. The back surface printing unit 111 may use impression of a recording agent, thermal transfer, ink-jet or the like.

The sheet having passed through the back surface printing unit 111 is next conveyed to a drying unit 112. The drying unit 112 heats the sheet passing in the g-direction in FIG. 1 within the unit with warm current of air (heated gas (air)) in order to dry a sheet to which ink has been applied in a short time. Instead of the use of warm current of air, various drying methods may be used such as use of cold air, heating by using a heater, natural drying simply by waiting, and irradiation of electromagnetic waves such as an ultraviolet ray. The cut sheets having printing unit lengths pass through the inside of the drying unit 112, are conveyed in the h-direction in FIG. 1 and are then conveyed to a sorter unit 114.

The sorter unit 114 holds a plurality of trays (18 trays in this embodiment), and sorts sheets into trays by the length of print units, for example. Each tray has a tray number. In the sorter unit 114, a sheet passing in the i-direction in FIG. 1 within the unit is discharged to the tray corresponding to the tray number set for each printed image by checking the vacancy of the trays and/or whether the trays are full of sheets or not with sensors provided on the trays. The cut sheets may be discharged to the tray designated by the source (host apparatus) of the print job or to an arbitrary vacant tray designated by the image forming apparatus. A predetermined number of sheets may be discharged to one tray. For a print job handling more sheets than the predetermined number of sheets, the sheets may be discharged over a plurality of trays. The number, size, type or the like of sheets dischargeable to a tray may depend on the size (type) of the tray, for example. In FIG. 1, the vertically (top-to-bottom) aligned trays (called large trays hereinafter) may accept both large-size (which is larger than L-size such as A4 size) sheets and small size (L-size) sheets. The horizontally (left-to-right) aligned trays (called small trays hereinafter) may accept small-size (L-size) sheets but do not accept large-size sheets. The large trays may accept more number of output sheets than the small trays.

The states of discharging sheets or completion of discharging may be identified by a user from an indicator (such as an LED). For example, a plurality of LEDs which emit different colors may be provided for the trays, and various states of the trays may be notified to a user with the colors of the lighted LEDs or either lighting state or blinking state. The plurality of trays may have a priority order. The image forming apparatus performing a print job assigns discharged sheets to vacant trays (without sheets) in the priority order. At default, the higher large trays have higher priority levels. The small trays on the left-hand side have higher priority levels. The large trays have higher priority levels than the small trays. A higher priority levels may be preset to the trays from which a user can more easily remove sheets. The priority order may be changed properly in accordance with an operation by a user.

A sheet winding unit 113 winds a sheet having its front surface printed without being cut by pages. In duplex printing mode, a sheet having an image on its front surface first is not cut into page units by the cutter unit 110 but is cut after the printing on the continuous front surface finishes. The sheet having its front surface printed passes in the j-direction in FIG. 1 within the unit and is wound by the sheet winding unit 113. The wound sheet having images for a series of pages on its front surface is turned to make the opposite side of the front surface printable, that is, the surface facing the print heads 106 is reversed. Then, the sheet is conveyed again in the k-direction in FIG. 1 within the unit. Images are printed on the opposite back surface of the front surface of the conveyed sheet. In normal simplex printing mode, a sheet having images printed is not wound by the sheet winding unit 113 but is conveyed to the sorter unit 114.

In this way, in duplex printing mode, the sheet winding unit 113 is used to wind a sheet, and the sheet is reversed to have its back surface printed. Thus, sheets are discharged to the sorter unit 114 with the sides being different from each other between simplex printing mode and duplex printing mode. In other words, since, in simplex printing mode, the reverse of sheet by using the sheet winding unit 113 is not performed, the sheet having an image of the first page printed is discharged with the image of the first page facing down. In one print job handling a plurality of pages, a sheet of the first page is discharged to a tray first, and sheets of the subsequent pages are sequentially discharged and are piled. This kind of discharge is called a face-down discharge. On the other hand, in duplex printing mode, since the sheet winding unit 113 is used to reverse a sheet, the sheet having an image of the first page printed is discharged with the image of the first page facing up. In one print job outputting a plurality of sheets, the sheet containing the last page is discharged to the tray first, and the preceding sheets are sequentially discharged and are piled. Finally, the sheet having an image of the first page printed is discharged. This kind of discharge is called a face-up discharge.

An operating unit 115 accepts various operations by a user and/or notifies a user of various kinds of information. For example, a printing condition for each job order can be checked including the tray having the sheet having the image designated by a user printed and/or whether the image is being printing or has completed printing. The operating unit 115 may further allow a user to check the states of the apparatus such as the remaining amount of ink and the remaining amount of sheet and/or operate and/or check for instructing to perform maintenance of the apparatus such as head cleaning.

Figure 2:
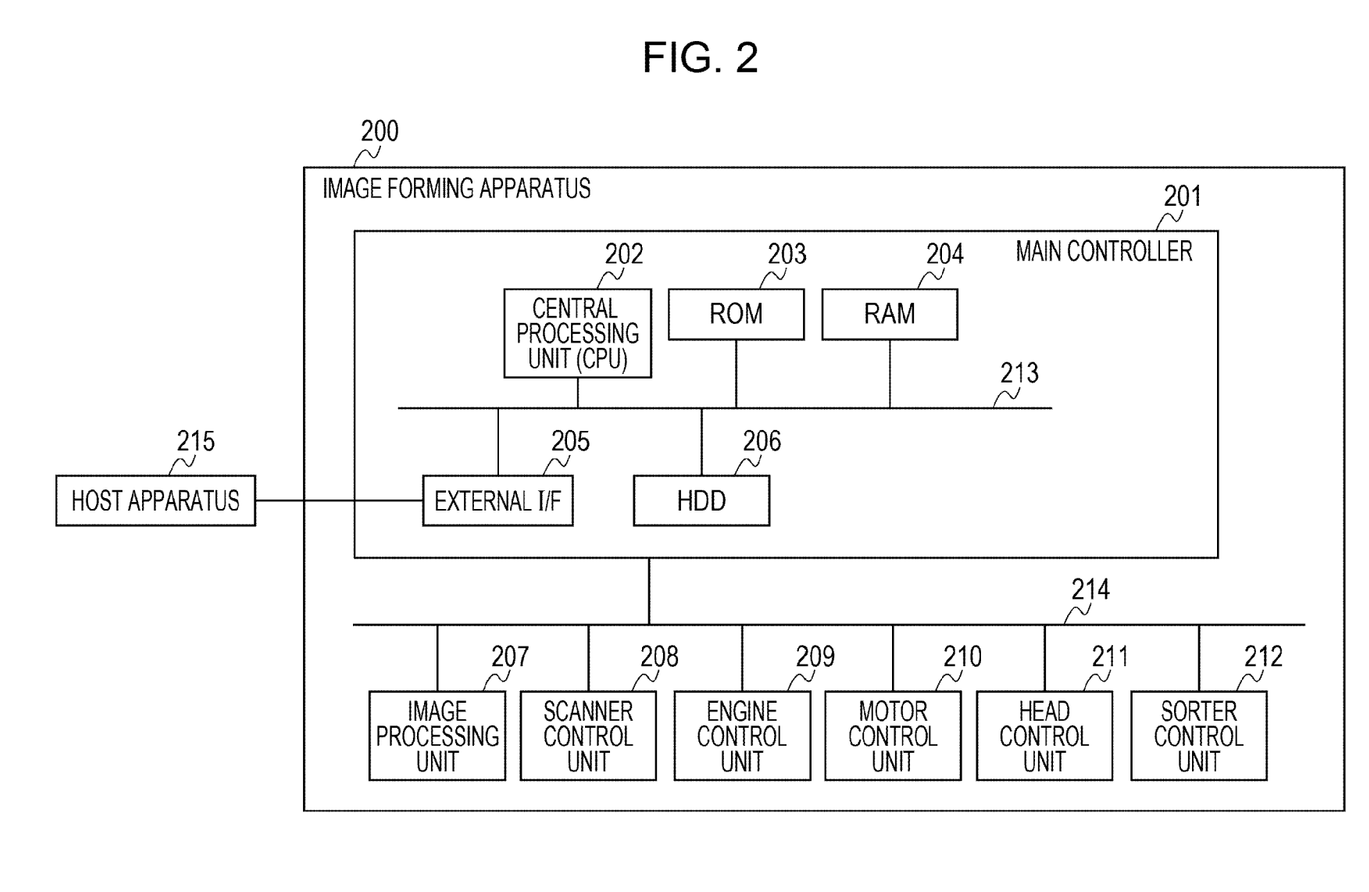
FIG. 2 is a block diagram illustrating a configuration relating to control in the image forming apparatus in FIG. 1.

FIG. 2 is a block diagram illustrating a configuration relating to control in the image forming apparatus illustrated in FIG. 1. An image forming apparatus 200 is the image forming apparatus illustrated in FIG. 1.

A main controller 201, image processing unit 207, scanner control unit 208, engine control unit 209, motor control unit 210, head control unit 211, and sorter control unit 212 illustrated in FIG. 2 are mainly included in the control unit 108. These components are communicable with each other via a system bus 214.

The main controller 201 includes a central processing unit (CPU) 202, a ROM 203, a RAM 204, an external I/F 205, and an HDD 206, and these components are communicable with each other via a system bus 213. The main controller 201 is responsible for control over the entire image forming apparatus 200.

The CPU 202 is a central processing unit being a microprocessor (microcomputer) and controls over the entire operations by the image forming apparatus 200 in accordance with the execution of a program or the start of hardware. The ROM 203 stores a program to be executed by the CPU 202 and/or fix data that are necessary for operations by the image forming apparatus 200. The RAM 204 may be used as a work area by the CPU 202, may be used as a temporary storage area for various receive data or may store setting data. The external I/F 205 connects the image forming apparatus 200 to an external apparatus. The external I/F 205 may be either local I/F or network I/F. The external I/F 205 may handle connection through wire or by radio. The HDD 206 may allow storing and/or reading a program to be executed by the CPU 202, for example, print data, setting information that is necessary for operations by the image forming apparatus 200 to/from the contained hard disk. Instead of the HDD 206, other large-capacity storage device may be used.

The image processing unit 207 performs image processing including expansion (conversion) of print data (such as data written in page description language) to be handled by the image forming apparatus 200 to image data (bitmap image). The image processing unit 207 converts the color space (such as YCbCr) of image data contained in input print data to the standard RGB color space (such as sRGB). The image processing unit 207 performs various kinds of image processing on image data, including the resolution conversion to a valid number of pixels (or printable number of pixels by the image forming apparatus 200), image analysis, and image correction, for example. The image data acquired by the image processing may be stored in an internal RAM, or the RAM 204 or HDD 206. The image processing unit 207 includes a CPU, a ROM, and a RAM, which are connected to each other via a system bus, like the main controller 201. The CPU performs the image processing as described above in accordance with a program stored in the ROM.

The scanner control unit 208 controls an image sensor in accordance with the control command received from the CPU 202, for example, and reads an image on a sheet, acquires analog luminance data of red (R), green (G) and blue (B) and converts them to digital data. The image sensor may be a CCD image sensor, CMOS image sensor or the like. The image sensor may be either linear image sensor or area image sensor. The scanner control unit 208 instructs the driving of the image sensor and acquires the condition of the image sensor on the basis of the driving. The scanner control unit 208 then analyzes the luminance data acquired from the image sensor to detect an ejection failure from the print heads 106 and the cut position of a sheet, for example. The sheet determined by the scanner control unit 208 as an image correctly printed undergoes dry processing of drying ink on the sheet and is discharged to the designated tray of the sorter unit. The scanner control unit 208 also includes a CPU, ROM, and RAM which are connected to each other via a system bus, like the main controller 201. The CPU performs scanning processing as described above in accordance with the program stored in the ROM.

The engine control unit 209 controls processing of printing an image based on print data on a sheet in accordance with a control command received from the CPU 202. The engine control unit 209 in printing processing controls a head control unit 211, a motor control unit 210, a scanner control unit 208 and a sorter control unit 212 to perform a series of printing processing operations. In other words, the engine control unit 209 controls application of ink by using the print heads 106, convey of a sheet, check on success/failure of image printing by using the image sensor and sorting by using a tray or trays of the sorter unit 114. The control command, data, status signals or the like may be transmitted and received to/from the main controller 201 via the system bus 214. The engine control unit 209 also includes a CPU, a ROM, and a RAM which are connected to each other via a system bus, like the main controller 201, and the CPU controls printing processing as described above in accordance with the program stored in the ROM.

In accordance with a control command received from the engine control unit 209, the motor control unit 210 instructs to drive a draw-out roller which draws a sheet and instructs to drive a conveying roller which conveys a drawn sheet and controls motors to implement those operations. The motor control unit 210 further acquires the rotation condition of the conveying rollers, conveys and stops a sheet at a proper speed and through a proper path and measures the length of the conveyed sheet. The motor control unit 210 also includes a CPU, a ROM, and a RAM which are connected to each other via a system bus, like the main controller 201. In accordance with the program stored in the ROM, the CPU controls processing relating to motors as described above.

The head control unit 211 may instruct the print heads 106 for different colors to eject ink, sets ejection timing for adjusting the dot positions (the positions of ink droplets) on a recording medium, and perform adjustment on the basis of the acquired state of the head driving. In accordance with a control command received from the engine control unit 209, the head control unit 211 controls driving of the print heads on the basis of print data and causes the print heads to eject ink to form the image on a sheet. The head control unit 211 also includes a CPU, ROM, and RAM which are connected via a system bus, like the main controller 201. In accordance with a program stored in the ROM, the CPU controls processing using the print heads 106 as described above.

The sorter control unit 212 performs control such as designation of a path for conveying a sheet and instruction to change the tray in accordance with a control command received from the engine control unit 209 in order to discharge the sheet to a tray of the sorter unit 114. The sorter control unit 212 can detect the presence of a sheet on a tray on the basis of the outputs of the sheet sensors on the trays. The sorter control unit 212 also includes a CPU, ROM, and RAM, which are connected via a system bus, like the main controller 201. In accordance with a program stored in the ROM, the CPU controls processing using the sorter unit 114 as described above.

The host apparatus 215 corresponds to the external apparatus and is connected to the image forming apparatus 200. The host apparatus 215 supplies image data to be printed by the image forming apparatus 200 and issues various print job orders.

The host apparatus 215 may be implemented by a general-purpose personal computer (PC) or may be other types of data supply device. Other types of data supply device may be an image capturing apparatus which captures an image to generate image data. The image capturing apparatus may be a reader (scanner) which scans an image on an original document and generates image data based on the scanned image or a film scanner which reads a negative or positive film generates image data based on the read film. Other examples of the image capturing apparatus may include a digital camera which photographs a still image to generate digital image data and a digital video camera which captures a movie to generate moving image data. Alternatively, a photo storage may be provided on a network, or the image forming apparatus may have a socket that receives a movable portable memory. Thus, an image file stored in the photo storage or a portable memory may be read, and the image data may be generated based on the read image file and printed therefrom. Instead of the general-purpose PC, a terminal that is special for the image forming apparatus may be used, or various data supply devices may be used. These data supply devices may be a component or components of the image forming apparatus or separate devices externally connected to the image forming apparatus. When the host apparatus 215 is a PC, an OS, application software which generates image data, a printer driver for the image forming apparatus 200 are installed in a storage device of the PC. The printer driver may control the image forming apparatus 200 and converts image data supplied from the application software to a format supported by the image forming apparatus 200 to generate print data. The conversion from print data to image data may be performed in the host apparatus 215, and the resulting data may then be supplied to the image forming apparatus 200. All of the processing operations described up to this point are not required to implement by software, but a part or all of the processing operations may be implemented by hardware. The image data, other commands and status signals supplied from the host apparatus 215 may be transmitted and received to and from the image forming apparatus 200 through the external I/F 205.

In the example above, each of the function blocks has a CPU, but the present invention is not limited thereto. Some of the function blocks may not have a CPU but may operate under the control of the main controller 201 or the main controller 201 and engine control unit 209. The function blocks may be responsible for the operations in the way excluding the configuration illustrated in FIG. 2 so that they can be properly divided into separate processing units or control units or some of them can be merged. The function blocks may have various forms. A direct memory access controller (DMAC) may be used to read data from memory.

Figure 3:
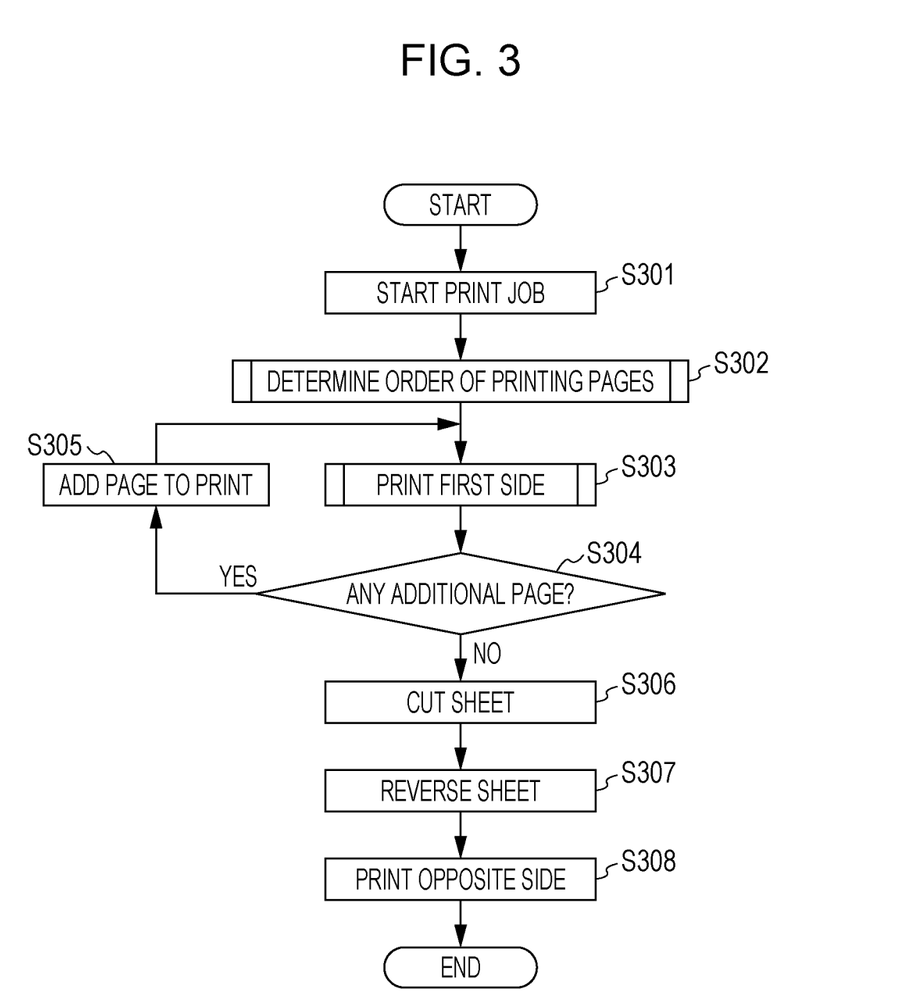
FIG. 3 is a flowchart illustrating a flow of processing according to this embodiment.

Next, there will be described a flow of processing executing a print job by the image forming apparatus 200 in this configuration. FIG. 3 is a flowchart illustrating a flow of processing for executing a print job when the image forming apparatus 200 receives the print job in duplex printing mode. The flowchart illustrates a flow of processing to be performed by loading and executing a control program stored in the ROM or the HDD 206 into the RAM by the CPU of the function block illustrated in FIG. 2. A print job may contain print data, an output sheet size indicating the size after sheet cut, a sheet type indicating the material of the sheet (such as plain paper, glossy paper, coated paper, and a film), and a printing mode (such as one side printing, duplex printing, and bookbinding printing). It is assumed that the size (roll width) and sheet type of the sheets set in the sheet cassettes 101a and 101b are pre-stored in the RAM 204 or the RAM in the engine control unit 209 by an operation by a user through the operating unit 115.

In S301, when a print job is received through the external I/F 205, the print job is started to process. The received print job is once stored in the HDD 206. In S302, the order of printing pages for the received print job is determined.

Figure 4:
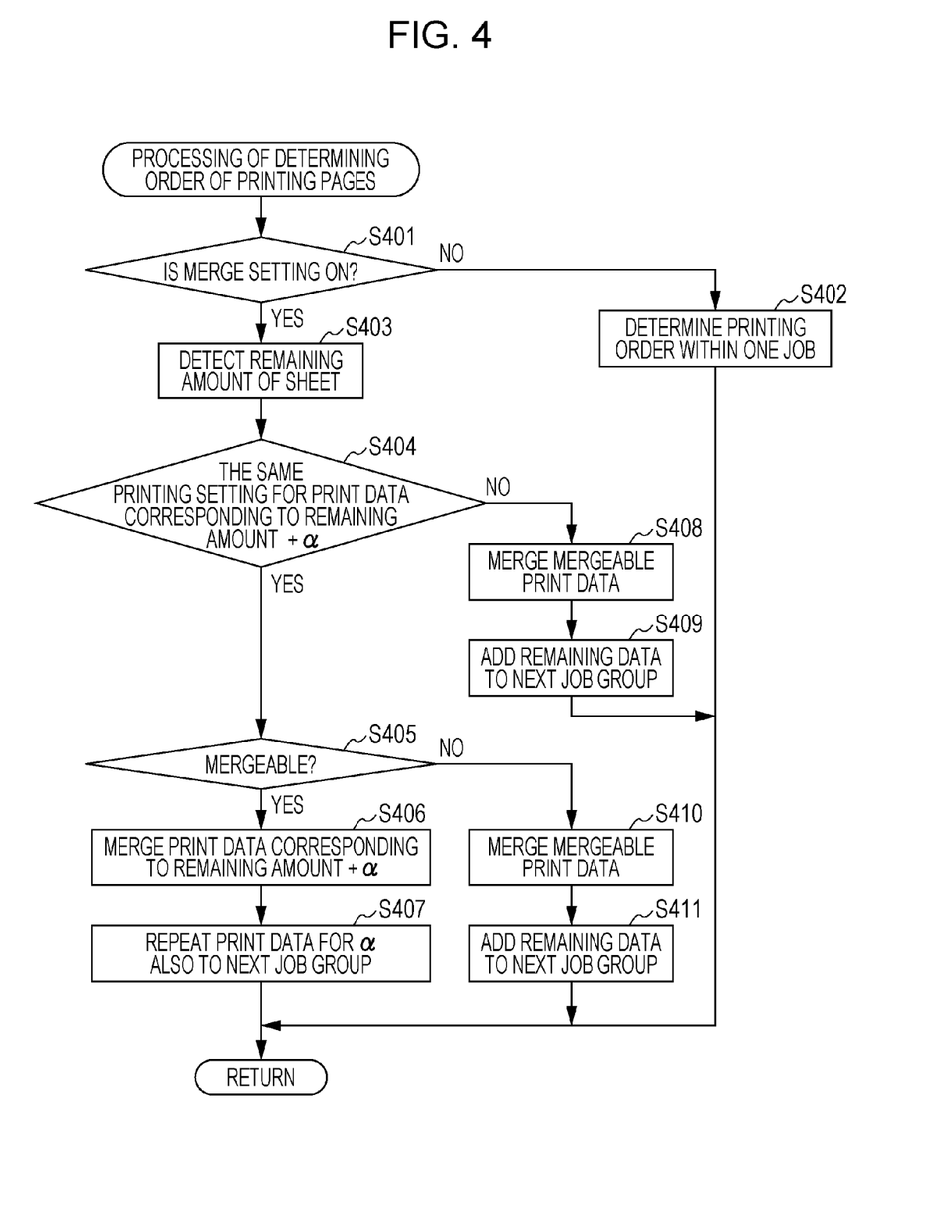
FIG. 4 is a flowchart illustrating a flow of processing of determining the order of printing pages.

FIG. 4 is a flowchart illustrating details of the processing in S302. The processing in the flowchart is performed by loading and executing a control program stored in the ROM 203 or HDD 206 into the RAM 204 by the CPU 202.

The image forming apparatus 200 may perform a plurality of print jobs continuously without cutting a sheet at the border of jobs (and merging print data). Whether merging print data of a plurality of print jobs is permitted or not (ON/OFF as a merge setting) may be set by a user with the operating unit 115. The set merge setting ON or OFF is stored in the RAM 204. In S401, the CPU 202 refers to the setting stored in the RAM 204 and thus determines whether the merge setting is ON or not.

If the merge setting is OFF, the merging over a plurality of print jobs is not performed. Then, the processing moves to S402, and the CPU 202 determines the order of printing pages in one print job. The order of printing pages is determined in accordance with the print layout (such as settings (such as a binding method) in simplex printing, duplex printing and bookbinding printing modes). In this case, the position to cut the sheet is determined in accordance with the print settings such as the print layout and sheet type (including its size and sheet type). Here, the size refers to a two-dimensional size in ISO A series or B series, and the sheet type refers to the material of a sheet such as plain paper and glossy paper.

In order to print both sides of a sheet, the page order is determined such that one side (first side) can be continuously printed, and the opposite side can then be printed continuously in the opposite sequence of printing the first side. For example, in order to arrange print data pieces of Pages 1 to 6 to both sides of a sheet in an increasing order of page numbers, images for Pages 1, 3, and 5 are first printed sequentially on the front surface of a sheet. Next, after the sheet is reversed, images for Pages 6, 4, and 2 are printed sequentially. In order to print the back surface first, the back surface is set as the first side, and images of Pages 6, 4, and 2 are sequentially printed thereon. After the sheet is reversed, images of Pages 1, 3, and 5 are printed sequentially. In the latter case, sheets are discharged with their face down, like one side printing mode.

Printing in the page order requires reversing a sheet only once and can increase the efficiency of the job processing. In bookbinding printing mode, though the arrangement order of pages may be different, the page order is determined so as to print one side continuously.

However, a different print setting (sheet type) between pages may require changing the source of a sheet or replacing with another sheet. Thus, in duplex printing mode, it is determined that print data of pages to be printed on the first side with the same print settings are arranged to print continuously. It is determined that the sheet is once cut before the print setting is changed. It is determined that the opposite side is printed after that, a new sheet is fed, and the remaining print data is printed.

In this case, whether a setting relating to the sheet type among print settings specified for a print job is the same or not is determined, and printing is performed continuously even the other print settings are different. In other words, whether the sheets to be used are the same or not is determined by comparing the sheet types of neighboring images to be arranged on the same side (first side) of sheets.

In order to print both sides of a sheet, the same print setting for the opposite side is required. The comparison between images on the first sides is enough because an error occurs before the print job is started when the print setting for the first side and the print setting for the opposite side are different in sheet type, for example.

Having described above that the print settings relating to the sheet type are compared, a difference may be determined in other settings (such as an image quality mode) if the difference does not allow continuous printing.

If it is determined in S401 that the merge setting is ON, the processing moves to S403 where the CPU 202 detects the remaining amount of the sheet to be used for the current printing processing. More specifically, the remaining amount may be detected on the basis of the diameter (or radius) of the roll of the sheet to be used for the current printing processing, which is set in the cassette 101a or 101b or the difference in count value between the length of the sheet when it is set and the length of the sheet used before this time, for example. The detection result is preferably the length not exceeding the actual remaining amount. The detected remaining amount is stored in the RAM 204.

In S404, the CPU 202 determines whether images for a plurality of pages to be arranged on the first side of the accepted one or plurality of print jobs have the same printing setting or settings over the length of the remaining amount of the sheet detected in S403 and additional region α or not. Neighboring images to be arranged on the same side of the sheet are to be compared, and images to be compared are sequentially changed. The print setting for the comparison in S404 may be a usable sheet size, and/or a sheet type to be used, like the comparison within one job. The print layout may vary. The length of the images across a plurality of pages may include the length of the margins of pages if they are provided between pages. The print data corresponding to the detected remaining amount of sheet ends at a page break and may be different from the remaining amount detected in S403 for some kinds of print job. The additional region α is longer than a predetermined length A and shorter than another predetermined length B (A<B) and has its end at a page break. The additional region α may be one page or a plurality of pages for some kinds of print job. The length of the additional region α may be determined in accordance with the detected remaining amount of a sheet or other conditions.

In S405, the CPU 202 determines whether pages for the remaining amount of sheet+α are mergeable or not. It is determined with reference to the following (1) and (2): (1) The length of the sheet to be used for the merged pages does not exceed a predetermined length. This is for preventing excessive delay of output of the preceding print job in duplex printing mode. (2) A tray of the sorter unit 114 is available for the merged pages. This is for preventing delay of printing due to unavailability of a tray. A group of images of a plurality of pages to be arranged on the same surface and to be printed continuously will be called a job group. In printing one job group, a sheet is not cut while the same surface is being printed but is kept being printed (continuously). If it is determined that the pages are mergeable, the processing moves to S406 where the print data corresponding to the detected remaining amount of the sheet and the print data corresponding to the additional region α are merged (made continuous) to generate one job group. Within the generated job group, the page order is determined in accordance with the printing mode. In duplex printing mode, the printing order (page order) of images to be arranged on the opposite side is also determined. In S407, the print data for the additional region α is also repeated (assigned) to the next job group. In other words, the print data for α is repeated in the two preceding and subsequent job groups.

If it is determined in S407 that the print settings (sheet type) for all of the remaining amount of sheet+α are not the same (including even partial pages not having the same print setting), the processing moves to S408 where the CPU 202 merges the print data for pages with the same setting from the beginning to generate one job group. Before merging, the mergeability is also determined here like S405, but the detail description will be omitted. If none of the pages have the same print setting, the pages are not merged. The rest of the pages not merged to the previous job group among the pages to be processed in S409 are merged into the next job group. The print data for the additional region α is not added here. Then, the printing order within each job group is determined.

Also if it is determined in S405 that the pages are not mergeable, print data for pages having the same print setting are merged from the beginning, and the print data for the rest of the pages are shifted to the next job group in S410 and 411, as in S408 and 409. In the processing in FIG. 4, when the external I/F 205 is a network I/F, various print jobs issued from various users of a plurality of host apparatuses present on a network are to be merged.

If the order of printing pages is determined in this way, the processing moves to S303, and the first side (which is the front surface here) of the sheet is started to print. In other words, in the determined printing order, the CPU 202 supplies the print data for the pages to the image processing unit 207. The CPU of the image processing unit 207 converts the print data to be printed on the front surface to a printable form (expansion to image data) and stores the image data to the HDD 206. The generated image data is supplied to the engine control unit 209 in the page order. Here, the side of the sheet to print the image data, page numbers, and information from which the print job can be identified are also notified in addition to image data to the engine control unit 209.

The CPU of the engine control unit 209 having received the image data causes the sheet cassette 101a or 101b based on the size of the images to be printed and the sheet type of the sheet to feed the sheet. The CPU of the engine control unit 209 causes the conveying unit 102 to convey the sheet to the print position by the head unit 105, sequentially prints the images based on the image data on the front surface of the sheet, and causes to conveys the sheet to the scanning position by the scanner unit 107. Whether the images have properly been printed or not is checked on the basis of the content of the image data which is acquired by scanning the printed images by the scanner unit 107, and the sheet is conveyed toward the cutter unit 110. If it is determined that the images have properly been printed, the sheet is not cut by the cutter unit 110 into page units. The sheet having continuous pages is passed through the drying unit 112, and the ink on the sheet is dried. Then, the sheet is wound by the sheet winding unit 113. On the other hand, if it is determined that the images have not properly been printed, the CPU of the engine control unit 209 causes the cutter unit 110 to cut the page which has not correctly printed to discharge it. The cut sheet is discharged to a tray (such as the lowest tray) that discharges a defective among the trays of the sorter unit 114. In order to re-print the print data which have not properly been printed, the CPU 202 supplies the image data to the engine control unit 209 again and repeats the subsequent operations.

In this way, in parallel with printing images on the front surface in S303, the CPU of the engine control unit 209 determines the presence of an additional page in S304. Even during printing in the previously determined printing order, the image forming apparatus 200 receives new print jobs sequentially and stores them in the HDD 206. It is more efficient to also print them continuously. The presence of an additional page may be determined in the same manner as S302 (FIG. 4). If it is determined that an additional page exists, the print page is added to the job group in S305, and the processing continues until the printing on the front surface finishes.

If printing all pages completes on the front surface in S303, and it is determined that no additional page exists, the processing moves to S306 where the CPU of the engine control unit 209 causes the cutter unit 110 to cut the sheet having its front surface printed. In S307, the sheet having its front surface printed wound by the sheet winding unit 113 is re-conveyed by the conveying unit 102 such that the opposite side of the first side directs toward the head unit 105. In S308, the back surface is printed. Since the printing on the back surface is performed in the same manner as the front surface, the detail description will be omitted. However, after printing on the back surface, the sheet is cut by the cutter unit 110 into page units (or may be cut into units corresponding to two pages in bookbinding printing mode). The cut sheets are discharged to a tray of the sorter unit 114.

In order to execute the subsequent print job which has been determined to shift to another job group on the basis of the processing in FIG. 4, the flow in FIG. 3 is repeated on the print jobs stored in the HDD 206. The sheet to be used in this case is fed from the cassette which is not used in the previous print job or is a sheet newly set in the cassette used by the previous print job. However, the processing up to the operation by the image processing unit 207 for the subsequent job group is performed in parallel with the printing processing on the previous job group. Thus, since the engine control unit 209 can continuously perform processing for a plurality of job groups, many print jobs can be executed efficiently.

Figure 6A:
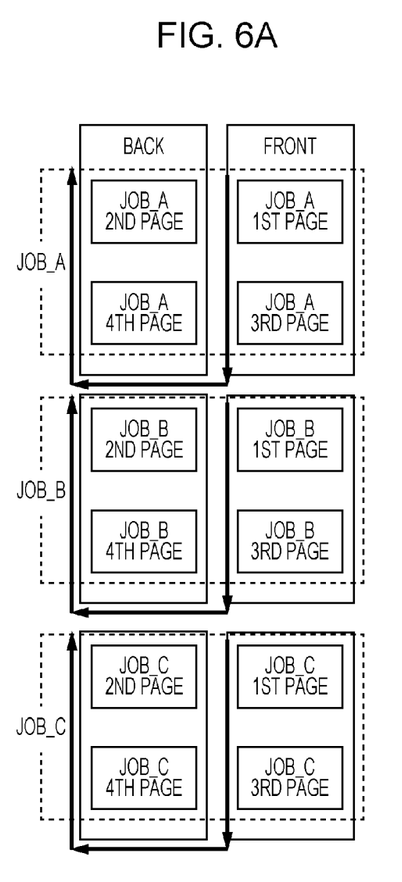
FIGS. 6A and 6B illustrate the printing order of a plurality of print jobs.
Figure 6B:
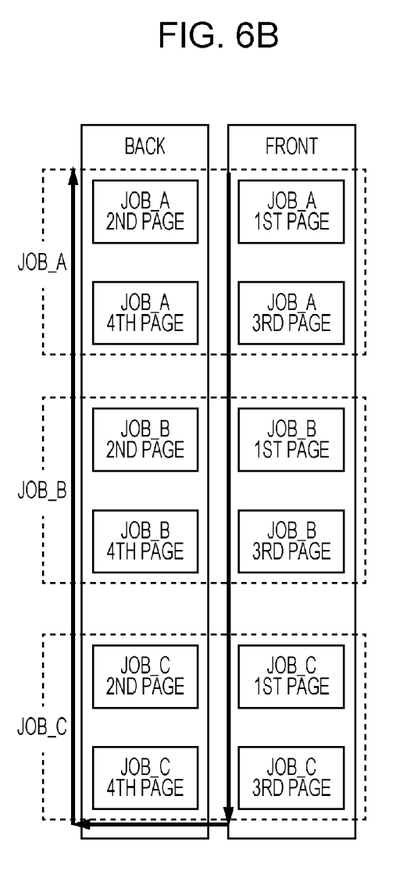

FIG. 6B illustrates the printing order to be performed when pages are merged by the processing above. It is assumed that a job A, a job B, and a job C which are different print jobs from each other are input, and it is instructed to execute the jobs in the arrangement as illustrated in FIG. 6B. It is further assumed that the pages to be arranged on the same side of a sheet have the same print setting regarding the sheet type.

When the operations in FIGS. 3 and 4 are performed to merge the pages (generate a job group), the pages are printed in the following order. That is, the pages are printed in order of the first page of the job A, the third page of the job A, the first page of the job B, . . . , and the third page of the job C are printed. The sheet is cut, and the cut sheets are reversed. Then, the pages are printed in order of the fourth page of the job C, the second page of the job C, . . . , and the second page of the job A. Thus, executing three print jobs only requires the sheet to be cut and reversed once until beginning printing the pages for the back surface of the sheet.

On the other hand, without the processing in FIGS. 3 and 4, printing is performed on one print job unit in the order as illustrated in FIG. 6A. That is, the first page and the third page of the job A are printed, and the sheet is cut and the cut sheets are reversed. Then, the fourth page and the second page are printed. In this case, in the sheet cassette having fed the sheet for the job A, the sheet is wound back after the sheet cut. After that, the sheet is started to feed again for execution of the job B, and the first page and the third page of the job B are printed. The sheet is cut, and the cut sheets are reversed. Then, the fourth page and the second page are printed. Then, the sheet is wound back and is fed again to perform the processing also for the job C. Thus, the execution of the three print jobs requires cutting and reversing the sheet three times, and re-winding and re-feeding are performed at least twice.

In this way, according to this embodiment, the numbers of times of cut, reverse, re-winding, and re-feeding of a sheet can be reduced as few as possible, and a plurality of print jobs can be significantly efficiently performed.

Figure 5:
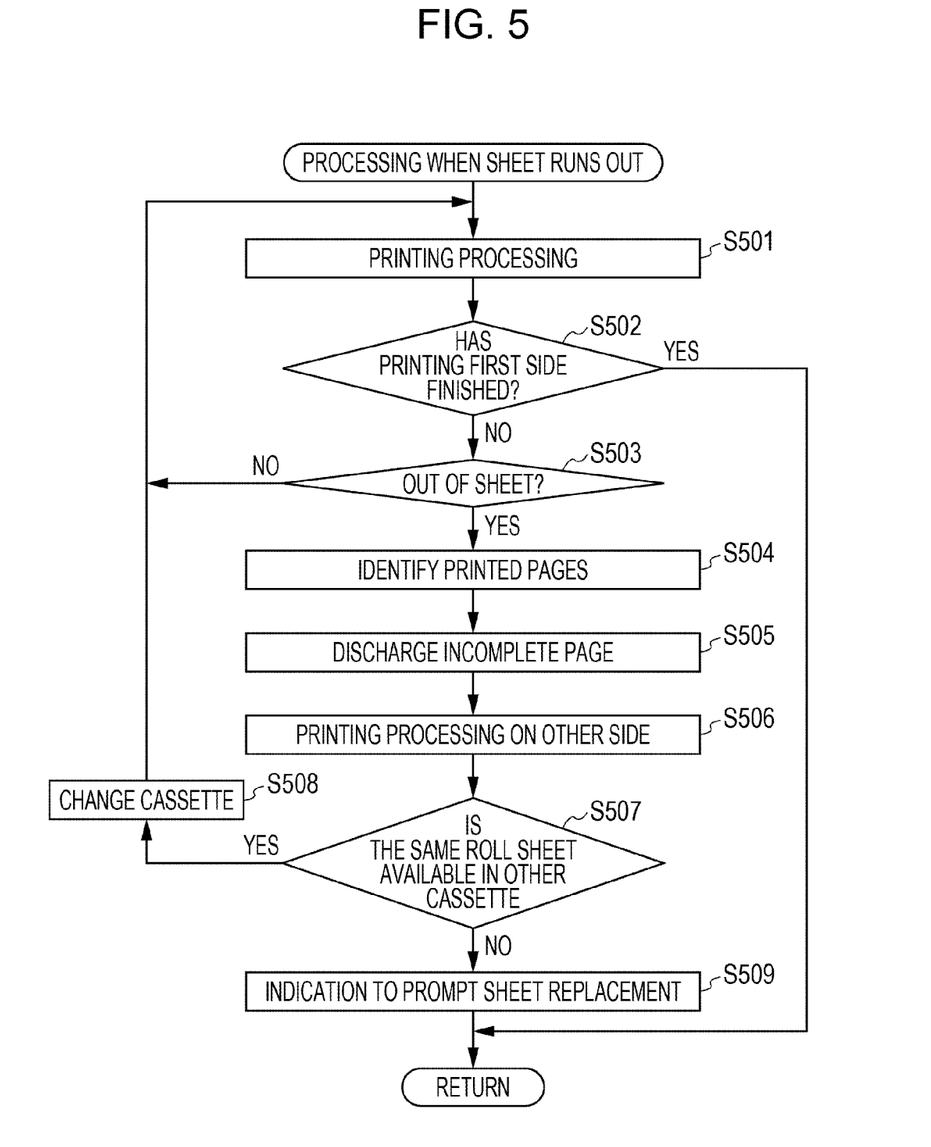
FIG. 5 is a flowchart illustrating a flow of processing in the case where sheet runs out during the printing processing.

Next, the processing will be described in the case where the sheet runs out during the printing processing on the first side in S303. FIG. 5 is a flowchart illustrating details of the processing in this case. The processing in the flowchart is implemented by loading and executing by the CPU of the engine control unit 209 a control program stored in the ROM or HDD 206 in the engine control unit 209 to the RAM of the engine control unit 209. Here, with reference to the flowchart in FIG. 4, the case will be described in which one job group is generated in S405 from print data for the remaining amount+α.

The printing processing starts in S501, and whether printing images for the number of pages to be arranged on the first side of the sheet in one job group has completed or not is determined in S502. If so, the processing moves to S306 in FIG. 3 where the opposite side is printed. If not, the processing moves to S503 where whether the sheet runs out during the printing processing or not is determined. If not, the printing processing continues in S501.

If it is determined in S503 that the sheet runs out during the printing processing, the processing moves to S504 where the last printed page in the job group generated in S406 is identified. The printed page refers to one having the entire image for one page printed properly. The information on the printed page identified here is stored in the RAM of the engine control unit 209.

In S505, when the sheet runs out at some point of a page being printed, resulting in an incomplete page, the sheet is cut at the page break of the previous page by the cutter unit 110. The sheet having the incomplete page printed is only discharged to a tray for discharging a defective in the sorter unit 114. When the printing processing is to be performed over the end of the sheet and if the rest of the sheet is shorter than the length for one page, the last page may not be printed. When images are normally printed on the first side of the sheet, the reversed sheet is re-conveyed from the sheet winding unit 113, and the opposite side is printed in S506. Here, in accordance with the last page printed on the first side, the previously determined order of printing pages is changed. In other words, the printing order is determined such that the image of the page on the opposite side corresponding to the page printed properly on the first side can be printed in the reverse order of the first side.

After the opposite side is printed, the processing moves to S507 where whether a sheet having the same size (roll width) and the same sheet type as the sheet having been determined as running out in S503 is set in the other cassette or not is determined. In other words, when the cassette 101a has supplied the sheet having been determine as running out in S503, whether the type of the sheet set in the cassette 101b is the same as that in the cassette 101a or not is determined. When the cassette 101b has supplied the sheet having been determined as running out in S503, whether the type of the sheet set in the cassette 101a is the same as that in the cassette 101a or not is determined.

If it is determined that a sheet having the same size and sheet type is set in the other cassette, the cassette that has supplied the sheet is switched to the other in S508. Then, the processing returns to S501 where the remaining pages (next job group) are printed. However, print data for a is added at the beginning of the next job group, and a part of the print data has already been properly printed. Thus, with reference to the information identified in S504, printing is performed from the subsequent page. In other words, the print data for the pages having properly been printed are skipped from the beginning of the print data for a, and printing on the first side starts from the print data which have not been printed for full one page. After that, the subsequent print data is printed, and the processing moves to printing on the opposite side.

If it is determined in S507 that a sheet having the same size and sheet type is not set in the other cassette, the processing moves to S509 where the CPU 202 instructs the operating unit 115 to prompt to replace the sheet and indicate the size and sheet type of the sheet to be set. When the applicable sheet is set in one of the cassettes, the printing processing continues the processing from S501.

Figure 7:
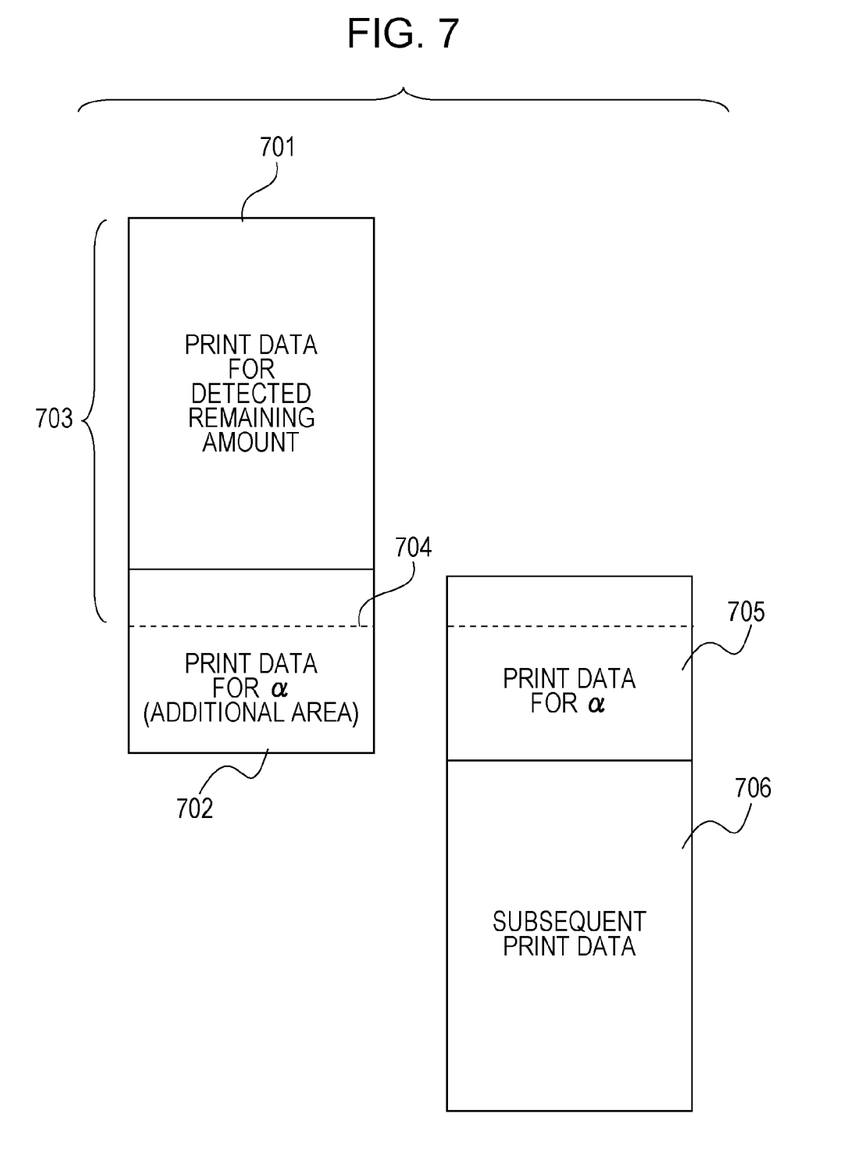
FIG. 7 illustrates assignment of print data.

FIG. 7 schematically illustrates print data to be arranged on the first side in the job group generated in S405 and print data to be arranged on the first side in the next job group.

In FIG. 7, print data 701 corresponds to the detected remaining amount of the sheet, and print data 702 corresponds to the additional region α. The print data 701 and 702 are included in one job group. A region 703 is identified in S504 as having been properly printed. Printing has been properly performed in the previous job group up to a page break position 704, and the position 704 corresponds to the page position to start printing in the next job group. A print page 705 is the same as the print page having the page break position 704 and is followed by subsequent print data 706. The print page 705 and 706 are included in the next job group to be performed after the cassette change or sheet replacement.

Having described above that a plurality of print jobs in duplex printing mode are merged, for example, a print job in duplex printing mode and a job in one side printing mode may be merged, or a plurality of jobs in one side printing mode may be merged. In order to merge a plurality of print jobs even in one side printing mode, the efficiency of the processing may be increased by rewinding the sheet and reducing the number of times of re-feeding.

Having described that print jobs with print setting of the same size and sheet type are merged, the print jobs to be merged may have different size settings only. Since the sheet printed a smaller size image may be cut along both sides after the sheet is discharged, print jobs may be merged when the size of the sheet of the subsequent print job is smaller than the size of the sheet of the preceding print job. In other words, in the example in FIG. 6A or 6B, jobs A, B and C may be merged to one job group if the sheet size for the job A is A4, the sheet size for the job B is B5, and the sheet size for the job C is A4. When a plurality of sheet sizes are available for the subsequent print job, the sheet size that is the same as that of the sheet for the preceding print job is determined to apply among the plurality of sheet size, and the print jobs may be merged into one job group. The same is true for sheet types. When a job group is to be determined before starting the preceding print job and if a plurality of sheets are available for the preceding print job and subsequent print job, the print jobs may be merged into the same job group with the use of the sheets matched with each other.

In the processing described above, priority levels may be assigned to print jobs, and the printing order and/or mergeability may be changed in accordance with the priority levels. For example, if the preceding print job has a higher priority level and the subsequent print job has a lower priority than the preceding one, the subsequent print job is not merged so that the print job with a higher priority level can be completed earlier.

Having described above that the mergeability is determined in page units to merge jobs, the mergeability may be determined in job units to merge or not to merge jobs for preventing a print job from being separated at some point in the print job. In other words, some print job does not include pages having different sheet type between pages but includes all pages having the same sheet type. In this case, the mergeability may be determined in job units.

In the processing described above, the printing order is not limited to the order illustrated in FIG. 6B. The printing order may vary in accordance with the mechanism and discharging method of the image forming apparatus 200. In all cases, images for a plurality of print jobs are printed on the first side, and images are then printed on the opposite side.

According to this embodiment, the efficiency of processing may be increased by rewinding a sheet and reducing the number of times of re-feeding. Even when a sheet runs out, the print data to be printed after the change of the feeding cassette or sheet replacement may be prepared in advance. Thus, the printing after the change of the feeding cassette or sheet replacement can be performed efficiently. Furthermore, the sheet can be used without waste. Even when the remaining amount of the sheet is not accurately detected, the sheet can be used without waste.

Having described with reference to FIG. 4 that the remaining amount of the sheet is detected before printing is started, and, on the basis of the result of the detection, the print data for the additional region α is set at the end of the preceding job group and the beginning of the next job group, the present invention is not limited thereto. When it is determined during printing processing that the end of the sheet is approaching, the print data corresponding to the end may be also added to the beginning of the next print data (print data to be printed after the cassette change or sheet replacement) as additional region, and the processing may be performed as in FIG. 5. Also in this case, since print data for the next job group may be prepared in advance, printing can be started immediately after the cassette change or sheet replacement.

It has been assumed above that the print data for a extends beyond the end of the sheet. However, when the sheet runs out before the print data for a is started to print, the print data for the page which has not been printed for that reason may be added to the beginning of the next job group to print.

In all cases, the print data to be printed at the end of the sheet is also assigned to the beginning of the print data for the sheet after the cassette change or sheet replacement. In accordance with the print condition for the previous sheet, the starting page may be determined for printing on the sheet after the cassette change or sheet replacement. The assignment of the print data for the sheet after the cassette change or sheet replacement to the beginning is preferably performed before the completion of the printing on the sheet before the cassette change or sheet replacement.

In the processing described above, the processing such as scheduling based on the printing order, determination on mergeability, and setting of an additional region, excluding the printing processing, may be implemented by an external apparatus such as a host apparatus and an external controller, and, on the basis of the results of the processing, the image forming apparatus may be caused to implement the printing. The external apparatus preferably acquires a status or statuses (information such as the current print condition and the remaining amount of the sheet) from the image forming apparatus to determine the printing order and/or mergeability. In this case, the external apparatus functions as a print control apparatus.

The present invention is implemented by the following processing: Software (program) which implements the functions of the embodiment is supplied to a system or an apparatus through a network or a storage medium, and a computer (or CPU, MPU or the like) of the system or apparatus reads the program and thus performs the processing. The program may be executed by one computer or a plurality of computers in conjunction. Not all of the processing operations are required to implement by software, but a part or all of the processing operations may be implemented by hardware.

The present invention is not limited to the embodiment, but various changes (including the application to other embodiments and combinations with other embodiments) are possible on the basis of the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-041657 filed Feb. 26, 2010, which is hereby incorporated by reference herein in its entirety.

What is claimed is:

1. A print control apparatus capable of causing a printing unit to print on a continuous sheet supplied from a sheet supplying unit, the apparatus comprising:
    a determining unit which determines whether a continuous sheet usable for printing by the printing unit based on first print data and a continuous sheet usable for printing by the printing unit based on second print data are the same or not;
    a print control unit which, if the determining unit determines that they are the same, causes the printing unit to print an image based on the first print data and an image based on the second print data continuously on a continuous sheet supplied from the sheet feeding unit; and
    an assigning unit which, when an image based on the second print data is arranged at an end of a continuous sheet supplied from the sheet feeding unit, assigns the second print data to the beginning of print data to be printed on a continuous sheet newly set to the sheet feeding unit or a continuous sheet supplied from a second sheet feeding unit which is different from the sheet feeding unit.

2. The print control apparatus according to claim 1, further comprising an identifying unit which identifies a region in the image based on the second print data properly printed continuously with the image based on the first print data on a continuous sheet by the printing unit,
    wherein the print control unit causes the printing unit to start printing from the region following the region identified by the identifying unit in the image based on the second print data assigned by the assigning unit on a continuous sheet newly set to the sheet feeding unit or a continuous sheet supplied from the second sheet feeding unit.

3. The print control apparatus according to claim 1, further comprising:
    a detecting unit which detects the remaining amount of a continuous sheet to be supplied from the sheet feeding unit; and
    a determining unit which determines the first print data based on a received print job and in accordance with the remaining amount of the continuous sheet detected by the detecting unit and determines the second print data as additional region for the remaining amount of the continuous sheet detected by the detecting unit.

4. The print control apparatus according to claim 1, the print control unit causes the printing unit to print both sides of a continuous sheet by continuously printing a plurality of images of a plurality of print jobs to be arranged on a first side of the continuous sheet and then continuously printing a plurality of images of the plurality of print jobs to be arranged on the opposite side of the continuous sheet.

5. A print control method comprising:
    determining whether a continuous sheet usable for printing by a printing unit based on first print data and a continuous sheet usable for printing by the printing unit based on second print data are the same or not;
    causing, if it is determined that they are the same, the printing unit to print an image based on the first print data and an image based on the second print data continuously on a continuous sheet supplied from a sheet feeding unit; and
    assigning, when an image based on the second print data is arranged at an end of a continuous sheet supplied from the sheet feeding unit, the second print data to the beginning of print data to be printed on a continuous sheet newly set to the sheet feeding unit or a continuous sheet supplied from a second sheet feeding unit which is different from the sheet feeding unit.

6. A non-transitory computer-readable storage medium storing a computer-executable program, the program comprising:

determining whether a continuous sheet usable for printing by a printing unit based on first print data and a continuous sheet usable for printing by the printing unit based on second print data are the same or not;

causing, if it is determined that they are the same, the printing unit to print an image based on the first print data and an image based on the second print data continuously on a continuous sheet supplied from a sheet feeding unit; and assigning, when an image based on the second print data is arranged at an end of a continuous sheet supplied from the sheet feeding unit, the second print data to the beginning of print data to be printed on a continuous sheet newly set to the sheet feeding unit or a continuous sheet supplied from a second sheet feeding unit which is different from the sheet feeding unit.

7. The print control method according to claim 5, further comprising identifying a region in the image based on the second print data properly printed continuously with the image based on the first print data on a continuous sheet by the printing unit, wherein the printing unit is caused to start printing from the region following the identified region in the image based on the assigned second print data on a continuous sheet newly set to the sheet feeding unit or a continuous sheet supplied from the second sheet feeding unit.

8. The print control method according to claim 5, further comprising:

detecting the remaining amount of a continuous sheet to be supplied from the sheet feeding unit; and determining the first print data based on a received print job and in accordance with the detected remaining amount of the continuous sheet and determining the second print data as additional region for the detected remaining amount of the continuous sheet.

9. The print control method according to claim 5, further causing the printing unit to print both sides of a continuous sheet by continuously printing a plurality of images of a plurality of print jobs to be arranged on a first side of the continuous sheet and then continuously printing a plurality of images of the plurality of print jobs to be arranged on the opposite side of the continuous sheet.

10. The computer-readable storage medium according to claim 6, further comprising identifying a region in the image based on the second print data properly printed continuously with the image based on the first print data on a continuous sheet by the printing unit, wherein the printing unit is caused to start printing from the region following the identified region in the image based on the assigned second print data on a continuous sheet newly set to the sheet feeding unit or a continuous sheet supplied from the second sheet feeding unit.

11. The computer-readable storage medium according to claim 6, further comprising:

detecting the remaining amount of a continuous sheet to be supplied from the sheet feeding unit; and determining the first print data based on a received print job and in accordance with the detected remaining amount of the continuous sheet and determining the second print data as additional region for the detected remaining amount of the continuous sheet.

12. The computer-readable storage medium according to claim 6, further causing the printing unit to print both sides of a continuous sheet by continuously printing a plurality of images of a plurality of print jobs to be arranged on a first side of the continuous sheet and then continuously printing a plurality of images of the plurality of print jobs to be arranged on the opposite side of the continuous sheet.

* * * * *